US011611652B2

(12) United States Patent
Merchant et al.

(10) Patent No.: US 11,611,652 B2
(45) Date of Patent: *Mar. 21, 2023

(54) TELECOMMUNICATIONS VALIDATION SYSTEM AND METHOD

(71) Applicant: Next Caller, Inc., Wilmington, DE (US)

(72) Inventors: MohammedAli Merchant, Wilmington, DE (US); Matthew Williams, Wilmington, DE (US); Tim Prugar, Wilmington, DE (US)

(73) Assignee: NEXT CALLER, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/186,815

(22) Filed: Feb. 26, 2021

(65) Prior Publication Data

US 2021/0227072 A1 Jul. 22, 2021

Related U.S. Application Data

(63) Continuation of application No. 16/375,853, filed on Apr. 4, 2019, now Pat. No. 10,938,982.

(51) Int. Cl.
*H04M 3/22* (2006.01)
*H04M 3/42* (2006.01)

(52) U.S. Cl.
CPC ..... *H04M 3/2281* (2013.01); *H04M 3/42059* (2013.01); *H04M 3/42306* (2013.01); *H04M 2203/6045* (2013.01)

(58) Field of Classification Search
CPC ........... H04M 3/2281; H04M 3/42059; H04M 3/42306; H04M 2203/6045
(Continued)

(56) References Cited

U.S. PATENT DOCUMENTS

7,653,188 B2   1/2010  Kloberdans et al.
7,839,987 B1 * 11/2010 Kirchhoff ............... H04M 3/54
                                                     379/142.01
(Continued)

*Primary Examiner* — Binh Kien Tieu
(74) *Attorney, Agent, or Firm* — Foley & Lardner LLP (57) ABSTRACT

According to an embodiment of the disclosure, a toll-free telecommunications validation system determines a confidence value that an incoming phone call to an enterprises' toll-free number is originating from the station it purports to be, i.e., is not a spoofed call by incorporating one or more layers of signals and data in determining said confidence value, the data and signals including, but not limited to, toll-free call routing logs, service control point (SCP) signals and data, service data point (SDP) signals and data, dialed number information service (DNIS) signals and data, automatic number identification (ANI) signals and data, session initiation protocol (SIP) signals and data, carrier identification code (CIC) signals and data, location routing number (LRN) signals and data, jurisdiction information parameter (JIP) signals and data, charge number (CN) signals and data, billing number (BN) signals and data, and originating carrier information (such as information derived from the ANI, including, but not limited to, alternative service provider ID (ALTSPID), service provider ID (SPID), or operating company number (OCN)). In certain configurations said enterprise provides an ANI and DNIS associated with said incoming toll-free call, which is used to query a commercial toll-free telecommunications routing platform for any corresponding log entries. The existence of any such log entries, along with the originating carrier information in the event log entries do exist, is used to determine a confidence value that said incoming toll-free call is originating from the station it purports to be. As a result, said entities or enterprises operating a toll-free number may be provided a confidence value regarding an incoming telephone call, and using that confidence value, further determine whether or not to accept the authenticity of the (Continued)

incoming telephone call and/or based on said confidence value, service the incoming call differently.

33 Claims, 6 Drawing Sheets

(58) Field of Classification Search
USPC .................................................. 379/142.05
See application file for complete search history.

(56) References Cited

U.S. PATENT DOCUMENTS

| | | | |
|---|---|---|---|
| 8,238,532 B1 * | 8/2012 | Cox | H04M 15/47 |
| | | | 379/144.03 |
| 8,406,223 B2 | 3/2013 | Battistello et al. | |
| 9,001,985 B2 | 4/2015 | Cox et al. | |
| 9,781,255 B1 | 10/2017 | Gailloux et al. | |
| 9,930,186 B2 | 3/2018 | Bandyopadhyay et al. | |
| 9,979,818 B2 | 5/2018 | Farris | |
| 10,146,919 B1 | 12/2018 | Osborne et al. | |
| 10,362,172 B2 | 7/2019 | Strong et al. | |
| 10,674,009 B1 * | 6/2020 | Jakobsson | H04M 3/382 |
| 10,938,982 B1 * | 3/2021 | Merchant | H04M 3/42059 |
| 2003/0112928 A1 * | 6/2003 | Brown | H04M 15/44 |
| | | | 379/67.1 |
| 2003/0147519 A1 | 8/2003 | Jain et al. | |
| 2003/0156693 A1 | 8/2003 | Goldman | |
| 2005/0254439 A1 | 11/2005 | Fleck et al. | |
| 2008/0084975 A1 | 4/2008 | Schwartz | |
| 2008/0112551 A1 | 5/2008 | Forbes et al. | |
| 2008/0205655 A1 * | 8/2008 | Wilkins | G06Q 10/10 |
| | | | 707/999.005 |
| 2009/0097630 A1 * | 4/2009 | Fotta | H04M 3/2281 |
| | | | 379/210.02 |
| 2013/0036458 A1 * | 2/2013 | Liberman | G06F 21/32 |
| | | | 726/5 |
| 2017/0302794 A1 * | 10/2017 | Spievak | H04M 3/2281 |
| 2018/0109664 A1 * | 4/2018 | Haltom | H04M 3/527 |
| 2018/0324297 A1 * | 11/2018 | Kent | H04M 3/42042 |
| 2019/0281157 A1 | 9/2019 | Gupta et al. | |

* cited by examiner

TELECOMMUNICATIONS VALIDATION SYSTEM AND METHOD

RELATED APPLICATIONS

U.S. application Ser. No. 17/186,815 is a continuation of U.S. application Ser. No. 16/375,853 filed Apr. 4, 2019 (now U.S. Pat. No. 10,938,982). U.S. application Ser. No. 16/375,853 is fully incorporated herein by reference.

TECHNICAL FIELD

This disclosure is generally directed to telecommunications validation systems. More specifically, this disclosure is directed to a system and method to determine a confidence value that an incoming telephone call (including from traditional public switched telephone networks, cellular networks, and VOIP providers) is originating from the station it purports to be.

BACKGROUND

Many entities, including enterprises such as banks, vendors, and service providers provide their customers a means to contact those enterprises by telephone, including toll-free numbers. And often such enterprises hold private or sensitive information, assets, or provide certain services for its customers. As such, those enterprises have a desire to know that the person calling is who he or she purports to be. One such indicator is the phone number of the incoming telephone call, which indicates that the telephone call is originating from the station it purports to be.

However, telephone number spoofing, or spoofing the automatic number identification (ANI) information can cause the telephone network to indicate to the receiver of a call that the originator of the call is a station other than the true originating station. For example, someone with malicious intent may utilize spoofing to cause an enterprise's caller ID system to display a phone number different from that of the telephone from which the call was placed, thereby impersonating the person(s) who the enterprise expects to be calling from the station at the spoofed telephone number.

Therefore, there is a need for providing a system and method for determining the trustworthiness of the purported phone number of an incoming call. More particularly, there is a need for a system and method of determining a confidence value that an incoming telephone call is originating from the station it purports to be.

SUMMARY OF THE DISCLOSURE

Given the above concerns, embodiments of the disclosure provide a solution related to providing a determination of a confidence value that an incoming phone call to an enterprises' toll-free number is originating from the station it purports to be, i.e., is not a spoofed call. More specifically, the embodiments of the disclosure incorporates one or more layers of signals and data in determining said confidence value, the data and signals including, but not limited to, toll-free call routing logs, service control point (SCP) signals and data, service data point (SDP) signals and data, dialed number information service (DNIS) signals and data, automatic number identification (ANI) signals and data, session initiation protocol (SIP) signals and data, carrier identification code (CIC) signals and data, location routing number (LRN) signals and data, jurisdiction information parameter (JIP) signals and data, charge number (CN) signals and data, billing number (BN) signals and data, and originating carrier information (such as information derived from one or more Call Identifiers, including, but not limited to, alternative service provider ID (ALTSPID), service provider ID (SPID), or operating company number (OCN)). As a result, said entities or enterprises operating a toll-free number may be provided a confidence value regarding an incoming telephone call, and using that confidence value, further determine whether or not to accept the authenticity of the incoming telephone call and/or based on said confidence value, service the incoming call differently.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The phrase "at least one of," when used with a list of items, means that different combinations of one or more of the listed items may be used, and only one item in the list may be needed. For example, "at least one of: A, B, and C" includes any of the following combinations: A; B; C; A and B; A and C; B and C; and A and B and C. Definitions for certain words and phrases are provided throughout this patent document, those of ordinary skill in the art should understand that in many if not most instances, such definitions apply to prior, as well as future uses of such defined words and phrases.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

The FIGURES described below, and the various embodiments used to describe the principles of the present disclosure in this patent document are by way of illustration only and should not be construed in any way to limit the scope of the disclosure. Those skilled in the art will understand that the principles of the present disclosure invention may be implemented in any type of suitably arranged device or system. Additionally, the drawings are not necessarily drawn to scale.

Recognizing the above-described concerns in the background, certain embodiments of the disclosure provide a solution whereby a confidence value is determined for an incoming telephone call to represent the level of confidence that an incoming telephone call is originating from the station it purports to be. In certain embodiments a confidence value may be determined utilizing data and signals including, but not limited to: toll-free call routing logs, originating carrier, service control point (SCP) signals and data, service data point (SDP) signals and data, dialed number information service (DNIS) signals and data, automatic number identification (ANI) signals and data, session initiation protocol (SIP) signals and data, carrier identification code (CIC) signals and data, location routing number (LRN) signals and data, jurisdiction information parameter (JIP) signals and data, charge number (CN) signals and data, billing number (BN) signals and data. In yet other embodiments a confidence value may be determined utilizing data and signals as described above, and further applying statistics and machine learning to one or more of said signals and data.

For example, a malicious entity may use an aggregator to send spoofed ANI information. And in the situation of the malicious entity using an aggregator to call the toll-free number of an enterprise such as a bank, the aggregator will need to obtain the toll-free routing data in order to route the call. Such toll-free routing data includes the carrier identification code (CIC) required to route the call. And to obtain the CIC, the aggregator dips, or queries a toll-free telecommunications routing platform which holds the toll-free call routing database. And a log of that query is created by the toll-free telecommunications routing platform.

Major national telecommunications carriers own and operate their own toll-free telecommunications routing platform, but aggregators cannot access those platforms. Instead, aggregators commonly rely on commercial toll-free telecommunications routing platforms, in the form of service control points (SCP) to dip (query) a database for the CIC required to properly route the toll-free call. Each such dip (query) to commercial toll-free telecommunications routing platforms are logged.

In a preferred embodiment, determining a confidence value that a toll-free call originated at the station it purports to be is based on the log entries of a commercial toll-free telecommunications routing platform. For a particular incoming call to an entity or enterprise's toll-free number, the incoming call's signaling (e.g., including, but not limited to, SIP, SS7, ISDN, and the like) ("Call Signaling"), including one or more of ANI, DNIS, JIP, LRN, CN, BN, or timestamp (collectively, "Call Identifiers") are compared against the logs from the commercial toll-free telecommunications routing platform. More specifically, the incoming call's Call Identifiers are used to query the log entries of the commercial toll-free telecommunications routing platform. If the commercial toll-free telecommunications routing platform has no log entry of the specified Call Identifiers, then it is likely the incoming call was routed by a major national telecommunications carrier, because such a carrier owns and operates its own platform for routing toll-free numbers and generally does not rely on a commercial toll-free telecommunications routing platform. Whereas if the incoming call was routed via an aggregator, it is highly likely that the commercial toll-free telecommunications routing platform would have a log entry of the timestamp and originating carrier (e.g. aggregator) that queried its database matching the specified Call Identifiers provided by the entity or enterprise receiving the call. Then, based on whether a log entry as described above exists, a confidence value may be assigned to that particular incoming call. Finally, said confidence value is provided to the entity or enterprise, which allows the entity or enterprise to make further informed decisions regarding the call based on the confidence value (e.g. accepting the call, routing the call to another department, take further verification steps, decline to accept the call, etc.)

Figure 1:
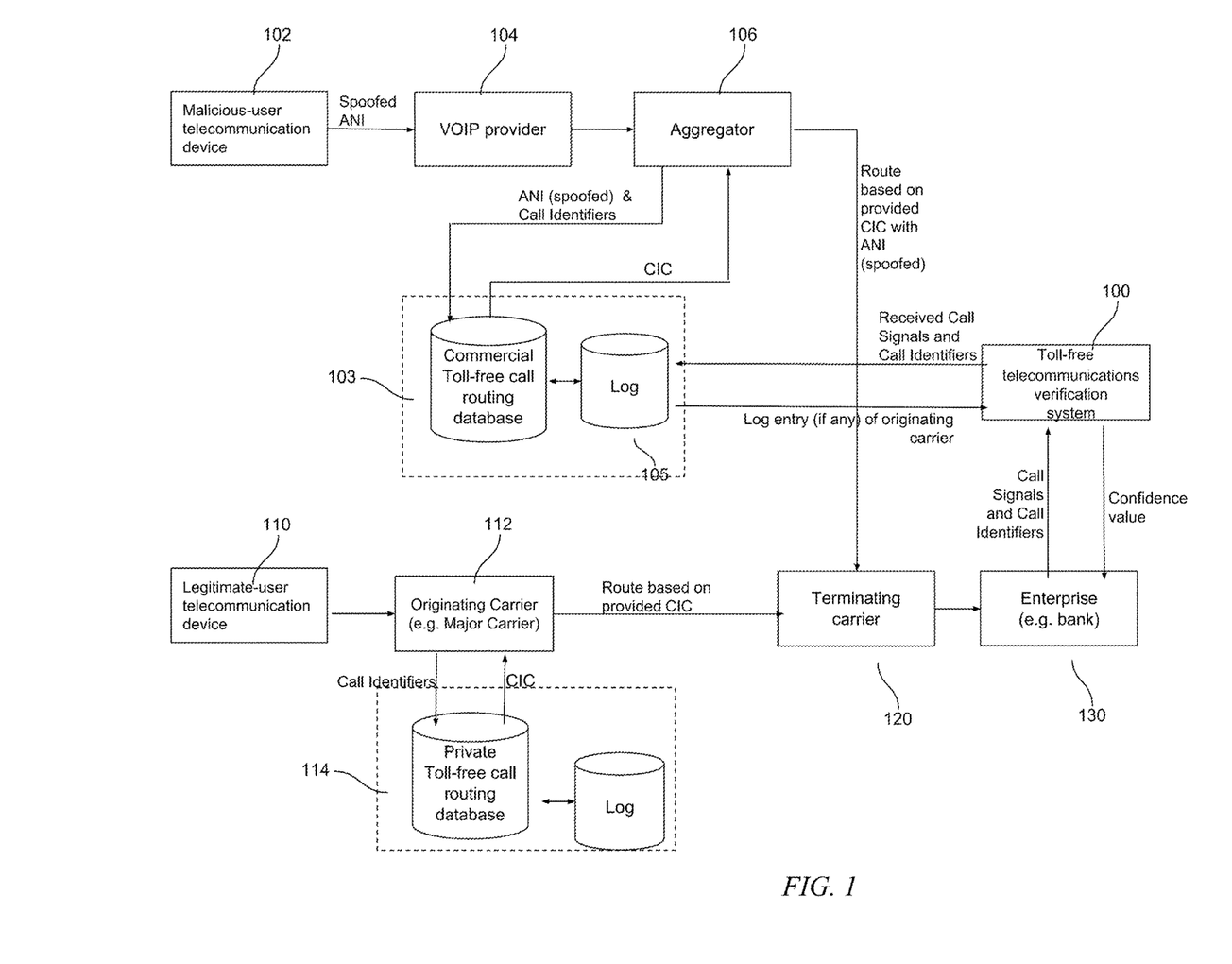
FIG. 1 is an exemplary diagram illustrative of an embodiment of the disclosure depicting the situations of a malicious-entity spoofed toll-free call and a legitimate-entity toll-free call.

FIG. 1 is an exemplary diagram of a spoofed call to a toll-free number and a legitimate call to a toll-free number according to embodiments of the disclosure invention. In FIG. 1, a malicious entity uses a telecommunication device 102 to initiate a call to the toll-free number of an enterprise 130 (e.g. a bank). The malicious entity uses a VOIP provider 104 and spoofs the ANI to appear to be calling from some other station (e.g. a legitimate-user device 110). The VOIP provider 104 utilizes the aggregator 106 to begin to route the call. In order to obtain the proper routing information and CIC, the aggregator 106 dips (queries) the commercial toll-free telecommunications routing platform 103 with one or more of the received Call Identifiers of the call, where the ANI has been spoofed. The commercial toll-free telecommunications routing platform 103 responds to the aggregator 106 by providing the CIC to properly route the call. The aggregator 103 routes the call to the terminating carrier 120 (possibly via one or more intermediates) who connects the call to the enterprise 130 (e.g. a bank). The enterprise 130 receives the Call Identifiers of the call and provides the Call Identifiers to the toll-free telecommunications validation system 100. The system 100 dips (queries) the commercial toll-free telecommunications routing platform 103 for log entries corresponding to the Call Identifiers for the call received by enterprise 130. Because the malicious entity's call was routed through an aggregator that dipped (queried) the commercial toll-free telecommunications platform 103 for the CIC information, a log entry will be found and retrieved. Such log entries may include data regarding the timestamp, querying entity, and originating carrier of the incoming call. Based on the existence of the log entry from the commercial toll-free telecommunications platform 103, it is an indicator that the incoming toll-free call has been spoofed, which will be reflected in determining the confidence value for the toll-free call (here, likely a spoofed call) that is provided to the enterprise 130.

In the situation where a legitimate entity calls from a telecommunication device 110, the originating carrier 112 owns and operates a private toll-free telecommunications routing platform 114, which provides the originating carrier 112 with the proper routing information and CIC to route the call to the terminating carrier 120. In this situation, when the toll-free telecommunications validation system 100 dips (queries) the log entries from the commercial toll-free telecommunications routing platform 103 using one or more of the received Call Identifiers of the call from the legitimate entity, no log entry will be found because the originating carrier 112 did not need commercial toll-free telecommunications routing platform 103 to route the call. Based then, on the non-existence of any log entry from the commercial toll-free telecommunications routing platform 103, there is an indicator that the incoming toll-free call originated from the station it purports to be, which will then be reflected in determining the confidence value for the toll-free call (here, likely a legitimate call) that is provided to the enterprise 130.

Further, those of ordinary skill in the art will understand that the confidence value may take on a range of values, for example from 0-100, which along with the existence and data (or lack thereof) of any log entries from commercial toll-free telecommunications routing platform 103, can also be affected by any combination of factors such as month, day of the month, day of the week, time, originating carrier information (such as ALTSPID, SPID or OCN derived from the ANI), and so on.

The example depicted in FIG. 1 and above-described examples are not meant to imply architectural or structural limitations. For example, the toll-free telecommunications validation system 100 may be incorporated and/or operated within commercial toll-free telecommunications routing platform 103. As another example, the commercial toll-free telecommunications routing platform 103 may also be a platform that accepts queries for routing information for telecommunications other than toll-free calls. Thus, embodiments of the disclosure may benefit from scenarios that do not involve toll-free calls. In such a configuration, the toll-free telecommunications validation system 100 may be a system for determining a confidence value for calls other than toll-free calls.

Embodiments of the disclosure also provide a mechanism for providing a confidence value to an incoming telephone call that indicates whether the station is who it purports to be. The confidence value may be determined based on factors including, but not limited to: (i) signaling and data associated with the incoming call (such as SIP messages, ANI, DNIS, etc.); (ii) logs from platforms which served routing information (such as CIC) associated with the incoming call; (iii) temporal indicators (such as the month, day of the month, day of the week, and time of day); (iv) information regarding the routing associated with the incoming call, obtained from the Call Signaling; (v) statistical models based on any one or more of the above information, signals, and data; (vi) and machine learning outputs based on any one or more of the above information, signals, data, and statistical models. After reviewing this disclosure, yet other mechanisms may become apparent to one of ordinary skill in the art. Such mechanisms may, in particular configurations, involve scenarios where data is not initially supplied with a call. However, through specific queries, such data may be added and correlated to the call.

Figure 2:
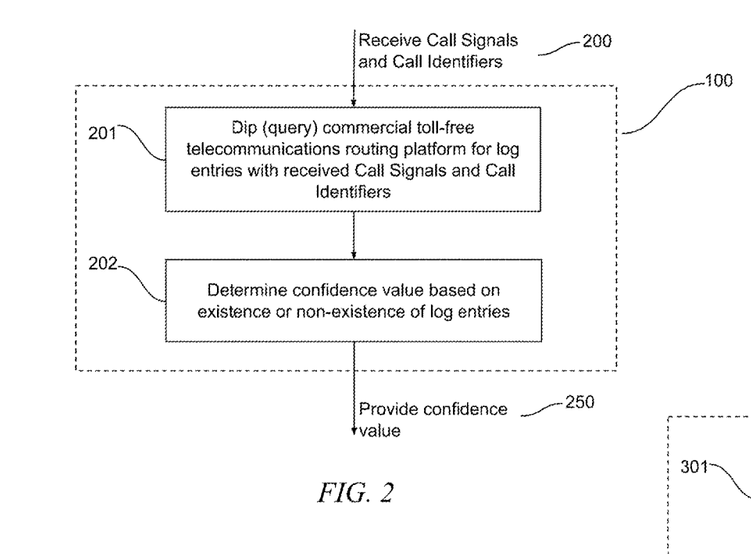
FIG. 2 is a flowchart outlining an embodiment of the disclosure when using a query for log entries of a commercial toll-free telecommunications routing platform to determine a confidence value.

FIG. 2 is a flowchart outlining an embodiment of an operation of the disclosure when using a query for log entries of a commercial toll-free telecommunications routing platform to determine a confidence value. At step 200, an entity or enterprise provides signals and data associated with the incoming toll-free call, including one or more of the Call Identifiers. At step 201, a dip (query) is made to commercial toll-free telecommunications routing platform for log entries with the received Call Identifiers. At step 202, a confidence value is determined based on the existence and data or non-existence of said log entries. Where the existence of log entries is an indicator that the incoming toll-free call is spoofed, and the non-existence of any log entries are an indicator that the incoming toll-free call originated from the station it purports to be. At step 250, provide said entity or enterprise with said confidence value.

Figure 3:
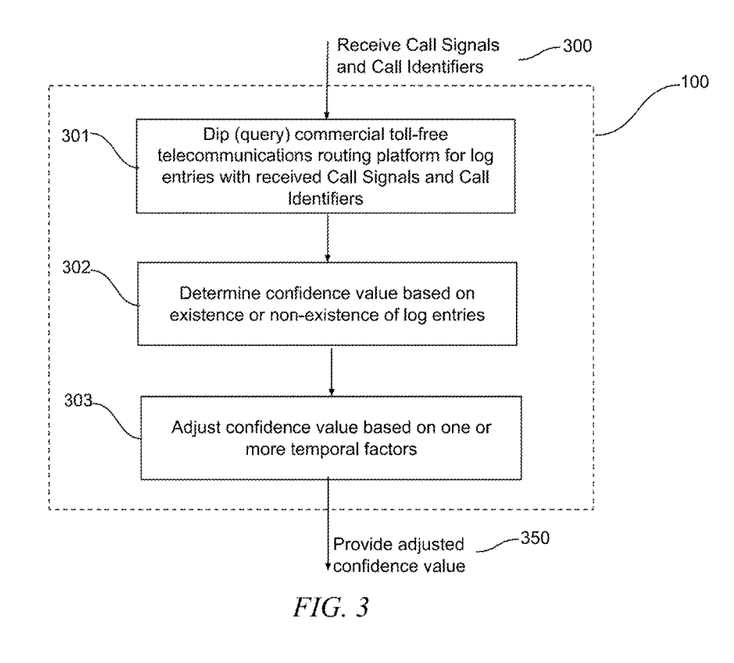
FIG. 3 is a flowchart outlining an embodiment of the disclosure invention whereby a confidence value is adjusted based on one or more temporal factors.

FIG. 3 is a flowchart outlining an embodiment of an operation of the disclosure whereby a confidence value is adjusted based on one or more temporal factors. At step 300, an entity or enterprise provides Call Signaling (including one or more Call Identifiers) associated with the incoming toll-free call. At step 301, a dip (query) is made to commercial toll-free telecommunications routing platform for log entries with one or more of the received Call Identifiers. At step 302, a confidence value is determined based on the existence and data or non-existence of said log entries. Where the existence of log entries is an indicator that the incoming toll-free call is spoofed, and the non-existence of any log entries are an indicator that the incoming toll-free call originated from the station it purports to be. At step 303, the confidence value is adjusted based on one or more temporal factors, including the month, day of the month, day of the week, time, and any received timestamps associated with the routing of the incoming call. At step 350, provide said entity or enterprise with said adjusted confidence value.

Figure 4:
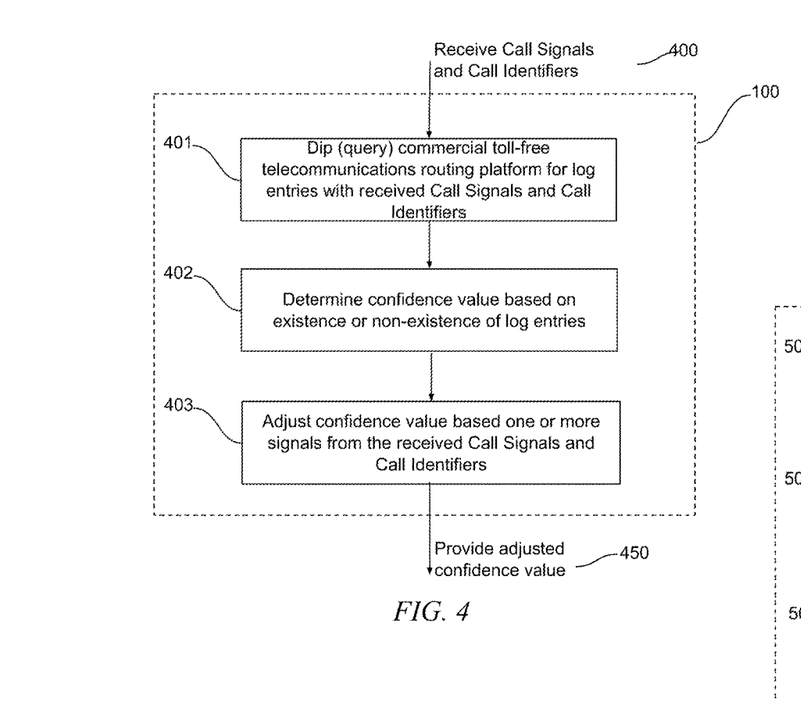
FIG. 4 is a flowchart outlining an embodiment of an operation of the disclosure whereby a confidence value is adjusted based on one or more signals from the call signaling data.

FIG. 4 is a flowchart outlining an embodiment of an operation of the disclosure whereby the confidence value is adjusted based on one or more signals from the Call Signaling. At step 400, an entity or enterprise provides Call Signaling (including one or more Call Identifiers) associated with the incoming toll-free call. At step 401, a dip (query) is made to commercial toll-free telecommunications routing platform for log entries with one or more of the received Call Identifiers. At step 402, a confidence value is determined based on the existence and data or non-existence of said log entries. Where the existence of log entries is an indicator that the incoming toll-free call is spoofed, and the non-existence of any log entries are an indicator that the incoming toll-free call originated from the station it purports to be. At step 403, said confidence value is adjusted based on the Call Signaling. For example, the Call Signaling, including one or more Call Identifiers, may further provide an indicator as to whether the incoming toll-free call is spoofed, and based on those additional indicator(s), said confidence value may be further adjusted. At step 450, provide the entity or enterprise is provided with the adjusted confidence value.

Figure 5:
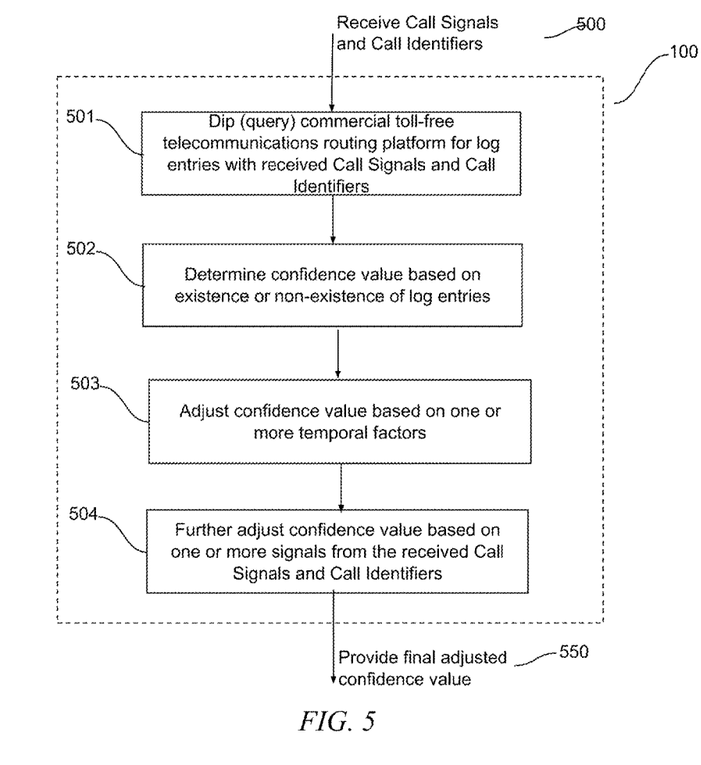
FIG. 5 is a flowchart outlining an embodiment of an operation of the disclosure whereby a confidence value is adjusted based on one or more temporal factors, and further adjusting said adjusted confidence value based on one or more signals from the call signaling data.

FIG. 5 is a flowchart outlining an embodiment of an of the disclosure whereby a confidence value is adjusted based on one or more temporal factors, and further adjusting said adjusted confidence value based on one or more signals from the Call Signaling (including one or more Call Identifiers)). At step 500, an entity or enterprise provides Call Signaling (including one or more Call Identifiers) associated with the incoming toll-free call. At step 501, a dip (query) is made to commercial toll-free telecommunications routing platform for log entries with one or more of the received Call Identifiers. At step 502, a confidence value is determined based on the existence and data or non-existence of said log entries. Where the existence of log entries is an indicator that the incoming toll-free call is spoofed, and the non-existence of any log entries are an indicator that the incoming toll-free call originated from the station it purports to be. At step 503, said confidence value is adjusted based on one or more temporal factors, including the month, day of the month, day of the week, time, and any received timestamps associated with the routing of the incoming call. At step 504, said adjusted confidence value is adjusted further still based on the Call Signaling. For example, the Call Signaling, including one or more Call Identifiers may further provide an indicator as to whether the incoming toll-free call is spoofed, and based on those additional indicator(s), said confidence value may be further adjusted. At step 550, the entity or enterprise is provided with the final adjusted confidence value.

Figure 6:
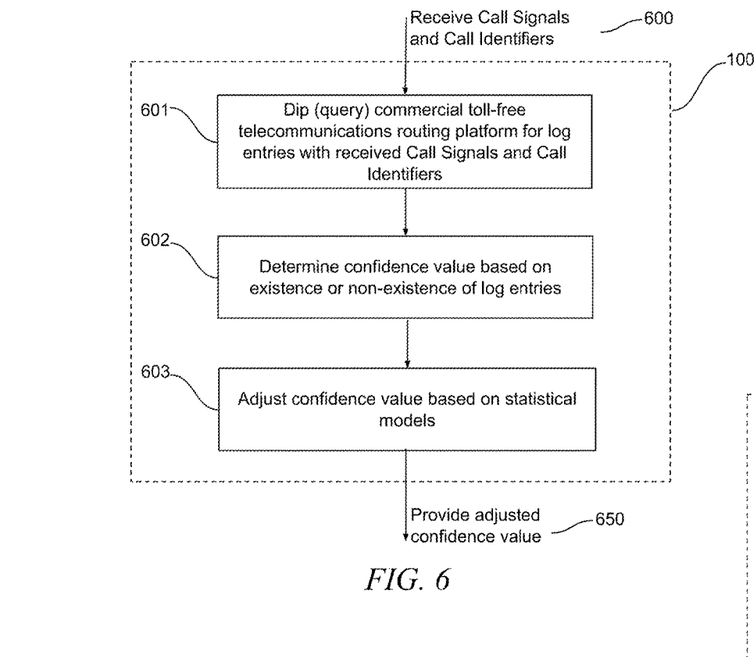
FIG. 6 is a flowchart outlining embodiment of an operation of the disclosure whereby a confidence value is adjusted based on applying statistical models built using historical data from previous toll-free calls.

FIG. 6 is a flowchart outlining an embodiment of an operation of the disclosure present invention whereby a confidence value is adjusted based on applying statistical models built using historical data from previous calls (including toll-free calls where applicable) comprising any combination of data and signals including, but not limited to: temporal factors, toll-free call routing logs, originating carrier information (such as ALTSPID, SPID or OCN derived from one or more of the Call Identifiers), dialed number information service (DNIS) signals and data, automatic number identification (ANI) signals and data, carrier identification code (CIC) signals and data, location routing number (LRN) signals and data, jurisdiction information parameter (JIP) signals and data, charge number (CN) signals and data, and billing number (BN) signals and data. At step 600, an entity or enterprise provides Call Signaling (including one or more Call Identifiers) associated with the incoming toll-free call. At step 601, a dip (query) is made to commercial toll-free telecommunications routing platform for log entries with one or more of the received Call Identifiers. At step 602, a confidence value is determined based on the existence and data or non-existence of said log entries. Where the existence of log entries is an indicator that the incoming toll-free call is spoofed, and the non-existence of any log entries are an indicator that the incoming toll-free call originated from the station it purports to be. At step 603, said confidence value is adjusted based on statistical models built using historical data comprising any combination of data and signals including, but not limited to: temporal factors, toll-free call routing logs, originating carrier information (such as ALTSPID, SPID or OCN derived from one or more of the Call Identifiers), dialed number information service (DNIS) signals and data, automatic number identification (ANI) signals and data, location routing number (LRN) signals and data, jurisdiction information parameter (JIP) signals and data, charge number (CN) signals and data, billing number (BN) signals and data, and carrier identification code (CIC) signals and data. For example, statistical models may be built correlating data from previously examined toll-free calls such as month, day of the week, and time with originating carrier and LRN data. Thus, by comparing and analyzing corresponding signals from the incoming toll-free call, such statistical models may provide further indicators to inform and further adjust said confidence value. At step 650, the entity or enterprise is provided with the adjusted confidence value.

Figure 7:
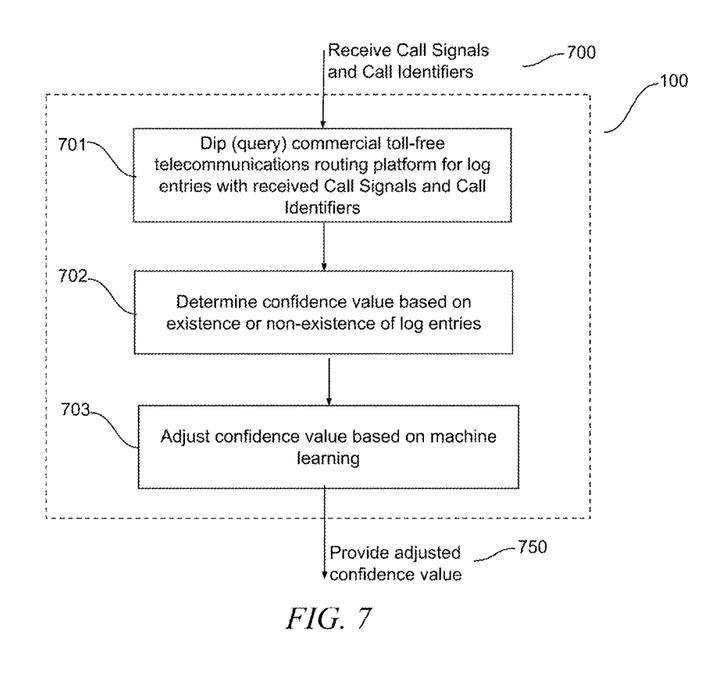
FIG. 7 is a flowchart outlining an embodiment of an operation of the disclosure whereby a confidence value is adjusted based on analysis of data associated with said incoming toll-free call by one or more machine learning algorithms trained using the same or related data from recent and historical toll-free calls.

FIG. 7 is a flowchart outlining an embodiment of an operation of disclosure whereby a confidence value is adjusted based on applying machine learning output generated by feeding machine learning algorithms with historical data comprising any combination of data and signals including, but not limited to: temporal factors, toll-free call routing logs, originating carrier information (such as ALTSPID, SPID or OCN derived from one or more of the Call Identifiers), dialed number information service (DNIS) signals and data, automatic number identification (ANI) signals and data, carrier identification code (CIC) signals and data, location routing number (LRN) signals and data, jurisdiction information parameter (JIP) signals and data, charge number (CN) signals and data, and billing number (BN) signals and data. At step 700, an entity or enterprise provides Call Signaling (including one or more Call Identifiers) associated with the incoming toll-free call. At step 701, a dip (query) is made to commercial toll-free telecommunications routing platform for log entries with one or more of the received Call Identifiers. At step 702, a confidence value is determined based on the existence and data or non-existence of said log entries. Where the existence of log entries is an indicator that the incoming toll-free call is spoofed, and the non-existence of any log entries are an indicator that the incoming toll-free call originated from the station it purports to be. At step 703, said confidence value is adjusted based on applying machine learning output generated by feeding machine learning algorithms with historical data comprising any combination of data and signals including, but not limited to: temporal factors, toll-free call routing logs, originating carrier information (such as ALTSPID, SPID or OCN derived from the ANI), dialed number information service (DNIS) signals and data, automatic number identification (ANI) signals and data, session initiation protocol (SIP) signals and data, carrier identification code (CIC) signals and data, location routing number (LRN) signals and data, jurisdiction information parameter (JIP) signals and data, charge number (CN) signals and data, and billing number (BN) signals and data. For example, a machine learning algorithm may be fed with historical and contemporaneous data of examined toll-free calls such as month, day of the week, time of day, originating carrier, and Call Signaling data. Then, over time, said machine learning algorithms may provide indicators to inform and further adjust said confidence value, but also said machine learning algorithms may be able to dynamically detect changes and shifts in patterns, signaling, and routing such that said machine learning algorithms can provide self-updating and self-correcting indicators to inform and further adjust said confidence value. Thus, by comparing and analyzing corresponding signals from the incoming toll-free call, such machine learning algorithms may provide indicators to inform and further adjust said confidence value. At step 650, the entity or enterprise is provided with said adjusted confidence value.

Figure 8:
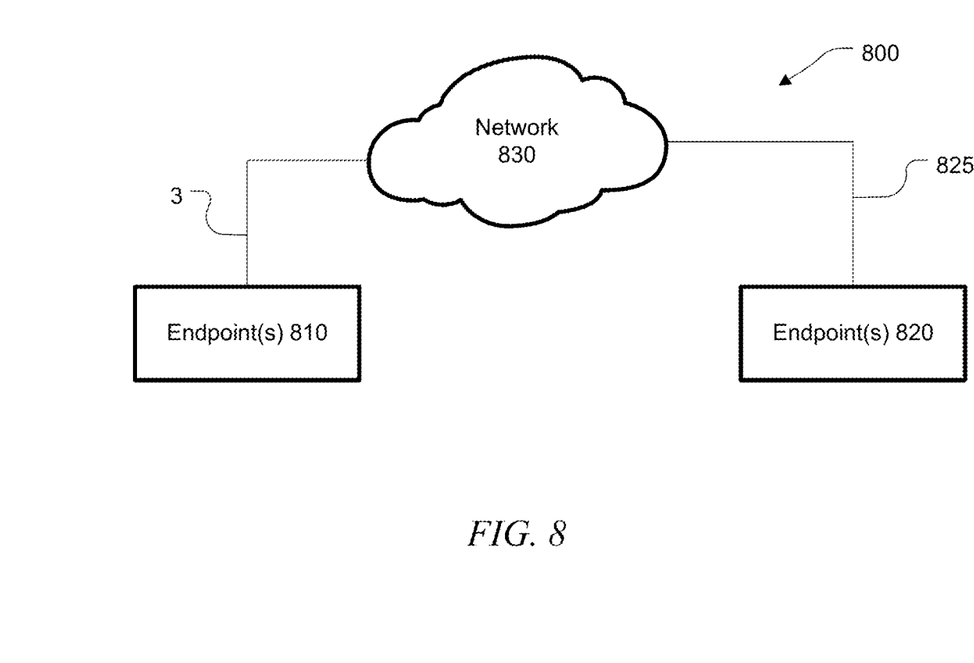
FIG. 8 is a simplified block diagram illustrative of a communication system that can be utilized to facilitate communication between endpoints through a communication network, according to particular embodiments of the disclosure.
Figure 9:
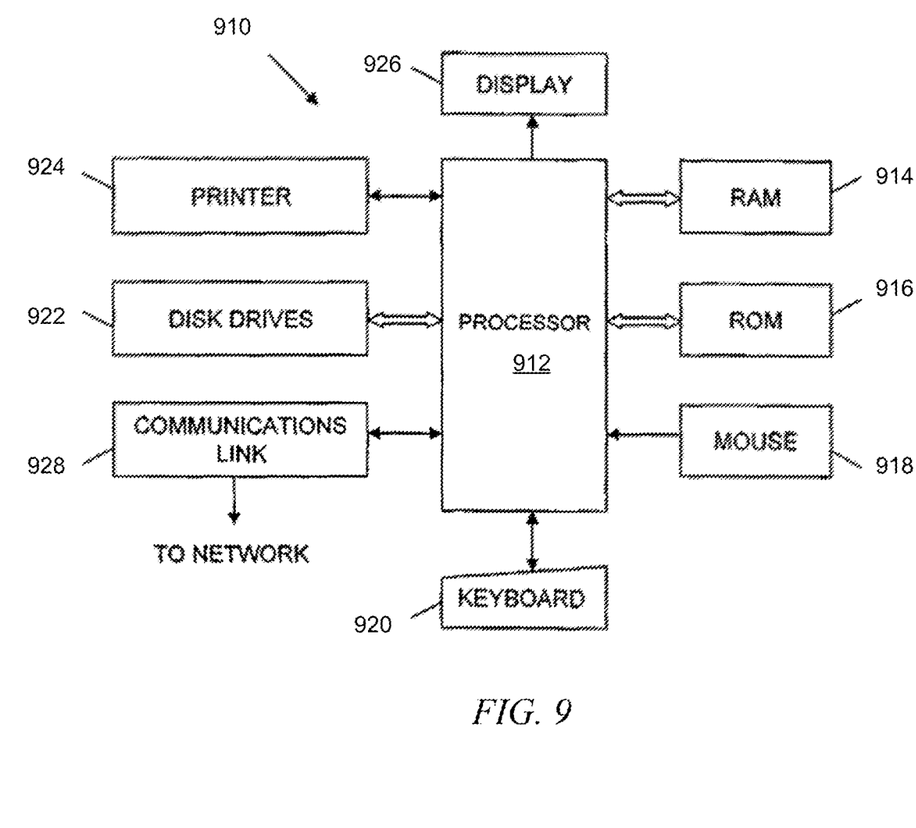
FIG. 9 is an embodiment of a general-purpose computer that may be used in connection with other embodiments of the disclosure.

FIGS. 8 and 9 describe non-limiting examples of communications and computers that may be utilized, according to various embodiments of the disclosure.

FIG. 8 is a simplified block diagram illustrative of a communication system 800 that can be utilized to facilitate communication between endpoint(s) 810 and endpoint(s) 820 through a communication network 830, according to particular embodiments of the disclosure. When referencing communication, for example, showing arrows or "clouds," or "networks," any of such communication may occur in the manner described below or other manners. Likewise, the endpoints may generally correspond to any two particular components described (or combination of component) with another component or combination of components.

As used herein, "endpoint" may generally refer to any object, device, software, or any combination of the preceding that is generally operable to communicate with and/or send information to another endpoint. In certain configurations, the endpoint(s) may represent a user, which in turn may refer to a user profile representing a person. The user profile may comprise, for example, a string of characters, a user name, a passcode, other user information, or any combination of the preceding. Additionally, the endpoint(s) may represent a device that comprises any hardware, software, firmware, or combination thereof operable to communicate through the communication network 830.

Examples of an endpoint(s) include, but are not necessarily limited to, a computer or computers (including servers, applications servers, enterprise servers, desktop computers, laptops, netbooks, tablet computers (e.g., IPAD), a switch, mobile phones (e.g., including IPHONE and Android-based phones), networked televisions, networked watches, networked glasses, networked disc players, components in a cloud-computing network, or any other device or component of such device suitable for communicating information to and from the communication network 830. Endpoints may support Internet Protocol (IP) or other suitable communication protocols. In particular configurations, endpoints may additionally include a medium access control (MAC) and a physical layer (PHY) interface that conforms to IEEE 801.11. If the endpoint is a device, the device may have a device identifier such as the MAC address and may have a device profile that describes the device. In certain configurations, where the endpoint represents a device, such device may have a variety of applications or "apps" that can selectively communicate with certain other endpoints upon being activated.

The communication network 830 and links 815, 825 to the communication network 830 may include, but is not limited to, a public or private data network; a local area network (LAN); a metropolitan area network (MAN); a wide area network (WAN); a wireline or wireless network (WIFI, GSM, CDMA, LTE, WIMAX, BLUETOOTH or the like); a local, regional, or global communication network; portions of a cloud-computing network; a communication bus for components in a system; an optical network; a satellite network; an enterprise intranet; other suitable communication links; or any combination of the preceding. Yet additional methods of communications will become apparent to one of ordinary skill in the art after having read this specification. In particular configuration, information communicated between one endpoint and another may be communicated through a heterogeneous path using different types of communications. Additionally, certain information may travel from one endpoint to one or more intermediate endpoint before being relayed to a final endpoint. During such routing, select portions of the information may not be further routed. Additionally, an intermediate endpoint may add additional information.

Although endpoint generally appears as being in a single location, the endpoint(s) may be geographically dispersed, for example, in cloud computing scenarios. In such cloud computing scenarios, and endpoint may shift hardware during back up. As used in this document, "each" may refer to each member of a set or each member of a subset of a set.

When the endpoints(s) 810, 830 communicate with one another, any of a variety of security schemes scheme may be utilized. As an example, in particular embodiments, endpoint(s) 820 may represent a client and endpoint(s) 830 may represent a server in client-server architecture. The server and/or servers may host a website. And, the website may have a registration process whereby the user establishes a username and password to authenticate or log in to the website. The website may additionally utilize a web application for any particular application or feature that may need to be served up to website for use by the user.

A variety of embodiments disclosed herein may avail from the above-referenced communication system or other communication systems.

FIG. 9 is an embodiment of a general-purpose computer 910 that may be used in connection with other embodiments of the disclosure to carry out any of the above-referenced functions and/or serve as a computing device for endpoint(s) 810 and endpoint(s) 820. In executing the functions described above with reference to FIGS. 1-8, the computer is able to things it previously could not do.

General purpose computer 910 may generally be adapted to execute any of the known OS2, UNIX, Mac-OS, Linux, Android and/or Windows Operating Systems or other operating systems. The general-purpose computer 910 in this embodiment includes a processor 912, random access memory (RAM) 914, a read only memory (ROM) 916, a mouse 918, a keyboard 920 and input/output devices such as a printer 924, disk drives 922, a display 926 and a communications link 928. In other embodiments, the general-purpose computer 910 may include more, less, or other component parts. Embodiments of the present disclosure may include programs that may be stored in the RAM 914, the ROM 916 or the disk drives 922 and may be executed by the processor 912 in order to carry out functions described herein. The communications link 928 may be connected to a computer network or a variety of other communicative platforms including, but not limited to, a public or private data network; a local area network (LAN); a metropolitan area network (MAN); a wide area network (WAN); a wireline or wireless network; a local, regional, or global communication network; an optical network; a satellite network; an enterprise intranet; other suitable communication links; or any combination of the preceding. Disk drives 922 may include a variety of types of storage media such as, for example, floppy disk drives, hard disk drives, CD ROM drives, DVD ROM drives, magnetic tape drives or other suitable storage media. Although this embodiment employs a plurality of disk drives 922, a single disk drive 922 may be used without departing from the scope of the disclosure.

Although FIG. 9 provides one embodiment of a computer that may be utilized with other embodiments of the disclosure, such other embodiments may additionally utilize computers other than general purpose computers as well as general purpose computers without conventional operating systems. Additionally, embodiments of the disclosure may also employ multiple general-purpose computers 910 or other computers networked together in a computer network. The computers 910 may be servers or other types of computing devices. Most commonly, multiple general-purpose computers 910 or other computers may be networked through the Internet and/or in a client server network. Embodiments of the disclosure may also be used with a combination of separate computer networks each linked together by a private or a public network.

Several embodiments of the disclosure may include logic contained within a medium. In the embodiment of FIG. 9, the logic includes computer software executable on the general-purpose computer 910. The medium may include the RAM 914, the ROM 916, the disk drives 922, or other mediums. In other embodiments, the logic may be contained within hardware configuration or a combination of software and hardware configurations.

The logic may also be embedded within any other suitable medium without departing from the scope of the disclosure.

It will be understood that well known processes have not been described in detail and have been omitted for brevity. Although specific steps, structures and algorithms may have been described, the present disclosure may not be limited to these specifics, and others may be substituted as is well understood by those skilled in the art, and various steps may not necessarily be performed in the sequences shown.

The description of the present invention has been presented for purposes of illustration and description, but is not intended to be exhaustive or limited to the invention in the form disclosed. Many modifications and variations will be apparent to those of ordinary skill in the art. The embodiments were chosen and described in order to best explain the principles of the invention, the practical application, and to enable others of ordinary skill in the art to understand the invention for various embodiments with various modifications as are suited to the particular use contemplated.

What is claimed is:

1. A method of validating telecommunications from commercial telecommunications routing platforms or carrier telecommunications routing platforms, the method comprising:

receiving, obtaining, or deriving one or more of: automatic number identification (ANI) data, dialed number information service (DNIS) data, location routing number (LRN) data, jurisdiction information parameter (JIP) data, charge number (CN) data, billing number (BN) data, or timestamp data for an incoming call;

requesting log entries of prior queries, the one or more log entries requested received during processing of the incoming call from one or more commercial telecommunications routing platform(s) or routing database(s) based on one or more of ANI, DNIS, JIP, LRN, CN, BN, or timestamp data, the prior queries corresponding to call-routing lookups for calls routed at the one or more commercial telecommunications routing platform(s) or routing database(s);

responsive to determining existence of said log entries of the prior queries at a commercial telecommunications routing platform or routing database, determining a confidence value for the incoming call based on the existence of said log entries and any originating carrier or querying entity information from said log entries; and wherein the requesting of the one or more log entries and determining of the confidence by a value verification system occurs after the incoming call has been routed to an enterprise to which the incoming is directed.

2. The method of claim 1, wherein said confidence value is adjusted based on call routing information obtained from call signaling.

3. The method of claim 2, wherein the call signaling is session initiation protocol (SIP), signaling system no. 7 (SS7), or integrated services digital network (ISDN).

4. The method of claim 2, wherein said confidence value is further adjusted based on one or more of ANI, DNIS, JIP, LRN, CN, BN, or timestamp data associated with said incoming call.

5. The method of claim 1, wherein said confidence value is adjusted based on one or more of
    the month;
    the day of the month;
    the day of the week;
    the time; and
    any timestamps associated with said incoming call.

6. The method of claim 1, wherein the receiving, obtaining, or deriving includes originating carrier information derived from one or more of ANI, JIP, LRN, CN, or BN.

7. The method of claim 6, where said confidence value is adjusted based on said originating carrier information, including one or more of Originating Carrier Number (OCN), Service Provider Identifier (SPID), or Alternate Service Provider Identifier (ALT SPID).

8. The method of claim 1, wherein said confidence value is adjusted based on one or more of ANI, DNIS, JIP, LRN, CN, BN, or timestamp data associated with said incoming call.

9. The method of claim 8 wherein said confidence value is further adjusted based on comparing data associated with said incoming call with corresponding data statistical data from corresponding historical data from previous calls or machine learning models trained using corresponding historical data from previous calls.

10. The method of claim 1, wherein said confidence value is adjusted based on comparing data associated with said incoming call with corresponding data from statistical data from corresponding historical data from previous calls or machine learning models trained using corresponding historical data from previous calls.

11. The method of claim 1, wherein requesting log entries includes requesting log entries from two or more commercial telecommunications routing platform(s) or routing database(s).

12. Non-transitory computer readable media of a verification system, the non-transitory computer readable media comprising logic for validating telecommunications from commercial telecommunications routing platforms or carrier telecommunications routing platforms, the logic when executed by one or more processor configured to:

receive, obtain, or derive one or more of: automatic number identification (ANI) data, dialed number information service (DNIS) data, location routing number (LRN) data, jurisdiction information parameter (JIP) data, charge number (CN) data, billing number (BN) data, or timestamp data for an incoming call;

request log entries of prior queries, the one or more log entries requested received during processing of the incoming call from one or more commercial telecommunications routing platform(s) or routing database(s) based on one or more of ANI, DNIS, JIP, LRN, CN, BN, or timestamp data, the queries corresponding to call-routing lookups for calls routed at the one or more commercial telecommunications routing platform(s) or routing database(s); and responsive to determining existence of said log entries of the prior queries at a commercial telecommunications routing platform or routing database, determine a confidence value for the incoming toll-free call based on the existence of said log entries and any originating carrier or querying entity information from said log entries wherein the requesting of the log entries and determining of the confidence value at the verification system occurs after the incoming call has been routed to an enterprise to which the incoming call is directed.

13. The non-transitory computer readable media comprising logic of claim 12, wherein said confidence value is adjusted based on call routing information obtained from call signaling.

14. The non-transitory computer readable media comprising logic of claim 13, wherein the call signaling is session initiation protocol (SIP), signaling system no. 7 (SS7), or integrated services digital network (ISDN).

15. The non-transitory computer readable media comprising logic of claim 13, wherein said confidence value is further adjusted based on one or more pieces of ANI, DNIS, JIP, LRN, CN, BN, or timestamp data associated with said incoming call.

16. The non-transitory computer readable media comprising logic of claim 12, wherein said confidence value is adjusted based on one or more of
the month;
the day of the month;
the day of the week;
the time; and
any timestamps associated with said incoming toll-free call.

17. The non-transitory computer readable media comprising logic of claim 12, wherein the step of receive, obtain, derive includes originating carrier information derived from one or more of ANI, JIP, LRN, CN, or BN.

18. The non-transitory computer readable media comprising logic of claim 17, where said confidence value is adjusted based on said originating carrier information, including one or more of Originating Carrier Number (OCN), Service Provider Identifier (SPID), or Alternate Service Provider Identifier (ALTSPID).

19. The non-transitory computer readable media comprising logic of claim 18, wherein said confidence value is further adjusted based on comparing data associated with said incoming call with corresponding data statistical data from corresponding historical data from previous calls or machine learning models trained using corresponding historical data from previous calls.

20. The non-transitory computer readable media comprising logic of claim 12, wherein said confidence value is adjusted based on one or more pieces of ANI, DNIS, JIP, LRN, CN, BN, or timestamp data associated with said incoming call.

21. The non-transitory computer readable media comprising logic of claim 12, wherein said confidence value is adjusted based on comparing data associated with said incoming call with corresponding data statistical data from corresponding historical data from previous calls or machine learning models trained using corresponding historical data from previous calls.

22. The non-transitory computer readable media comprising logic of claim 12, wherein said device is configured to request log entries from two or more commercial telecommunications routing platform(s) or routing database(s).

23. A computer-implemented of validating telecommunications from commercial telecommunications routing platforms or carrier telecommunications routing platforms, the method comprising:
directing an incoming call to an enterprise according to call signaling and call data for the incoming call;
during processing of the incoming call, querying one or more commercial telecommunications routing platforms or routing databases for one or more log entries of prior calls associated with at least one of the call signaling and the call data, the one or more log entries of the prior calls indicate the prior calls routed by the one or more commercial telecommunications routing platform or routing database; and
responsive to determining existence of said log entries at a commercial telecommunications routing platform or routing database, determining a confidence value for the incoming call based upon one or more factors, the one or more factors including the one or more log entries being identified in the one or more databases, wherein the querying of the log entries and determining of the confidence value by a verification system occurs after the incoming call has been directed to the enterprise.

24. The method of claim 23, wherein said confidence value is adjusted based on call routing information obtained from call signaling.

25. The method of claim 23, wherein the call signaling is session initiation protocol (SIP), signaling system no. 7 (SS7), or integrated services digital network (ISDN).

26. The method of claim 23, wherein said confidence value is adjusted based on one or more of
the month;
the day of the month;
the day of the week;
the time; and
any timestamps associated with said incoming call.

27. The method of claim 23, wherein the receiving, obtaining, or deriving includes originating carrier information derived from one or more of ANI, JIP, LRN, CN, or BN.

28. The method of claim 27, where said confidence value is adjusted based on said originating carrier information, including one or more of Originating Carrier Number (OCN), Service Provider Identifier (SPID), or Alternate Service Provider Identifier (ALTSPID).

29. The method of claim 23, wherein said confidence value is adjusted based on one or more of ANI, DNIS, JIP, LRN, CN, BN, or timestamp data associated with said incoming call.

30. The method of claim 29, wherein said confidence value is further adjusted based on one or more of ANI, DNIS, JIP, LRN, CN, BN, or timestamp data associated with said incoming call.

31. The method of claim 23, wherein said confidence value is adjusted based on comparing data associated with said incoming call with corresponding data from statistical data from corresponding historical data from previous calls or machine learning models trained using corresponding historical data from previous calls.

32. The method of claim 31, wherein said confidence value is further adjusted based on comparing data associated with said incoming call with corresponding data statistical data from corresponding historical data from previous calls or machine learning models trained using corresponding historical data from previous calls.

33. The method of claim 23, wherein requesting log entries includes requesting log entries from two or more commercial telecommunications routing platform(s) or routing database(s).

* * * * *